G. L. McCAIN.
LEVER LOCKING MEANS.
APPLICATION FILED APR. 14, 1920.

1,403,557.

Patented Jan. 17, 1922.

Inventor,
George L. McCain,
By Miller Pittetts
Atty.

UNITED STATES PATENT OFFICE.

GEORGE L. McCAIN, OF DETROIT, MICHIGAN, ASSIGNOR TO PACKARD MOTOR CAR COMPANY, OF DETROIT, MICHIGAN, A CORPORATION OF MICHIGAN.

LEVER-LOCKING MEANS.

1,403,557.   Specification of Letters Patent.   Patented Jan. 17, 1922.

Application filed April 14, 1920. Serial No. 373,695.

*To all whom it may concern:*

Be it known that I, GEORGE L. McCAIN, a citizen of the United States, and resident of Detroit, Wayne County, State of Michigan, have invented certain new and useful Improvements in Lever-Locking Means, of which the following is a specification:

This invention relates to locking means for movable levers to prevent the operative movement thereof and is particularly adapted for the control levers of motor vehicles.

The device is designed particularly for use in connection with the well known type of gear shifting lever used in motor vehicles, this lever being adapted for lateral movement on its pivot for selective engagement with the shiftable elements and for movement at right angles to the line of selective movement for operating the shiftable elements. The locking mechanism has for its function to prevent the lateral movement of the lever on its fulcrum, thereby preventing the shifting of the gears and in this way preventing theft or unauthorized use of the vehicle.

The object of the invention is to provide a mechanism of the character described which may be easily operated, will be strong in construction and will effectively lock the control lever against operative movement.

Figure 1:
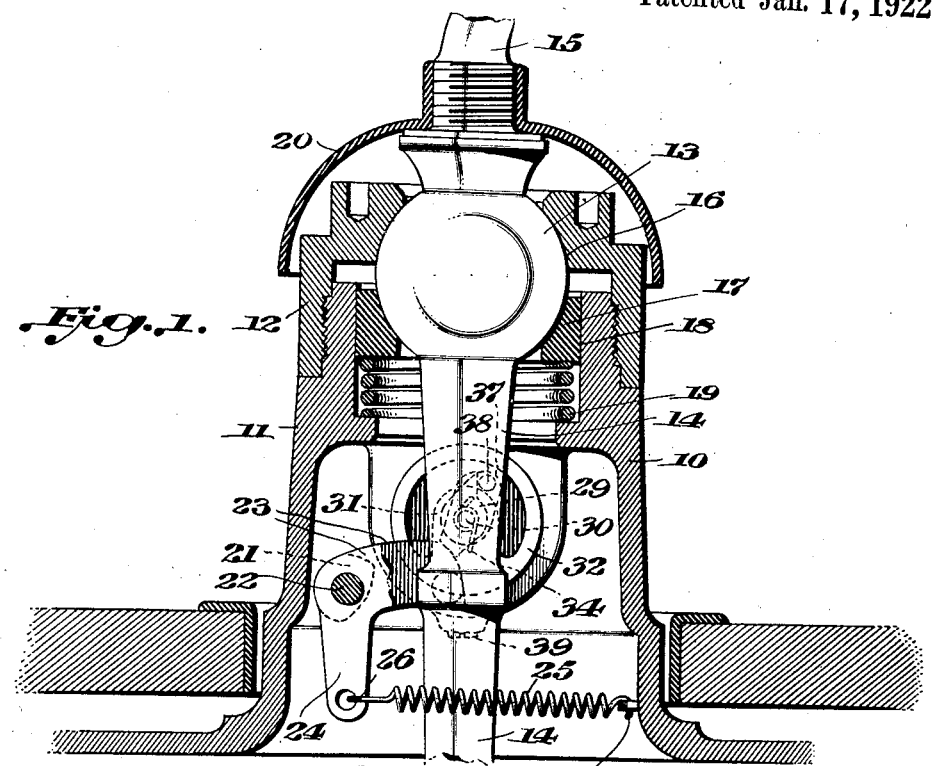
Figure 2:
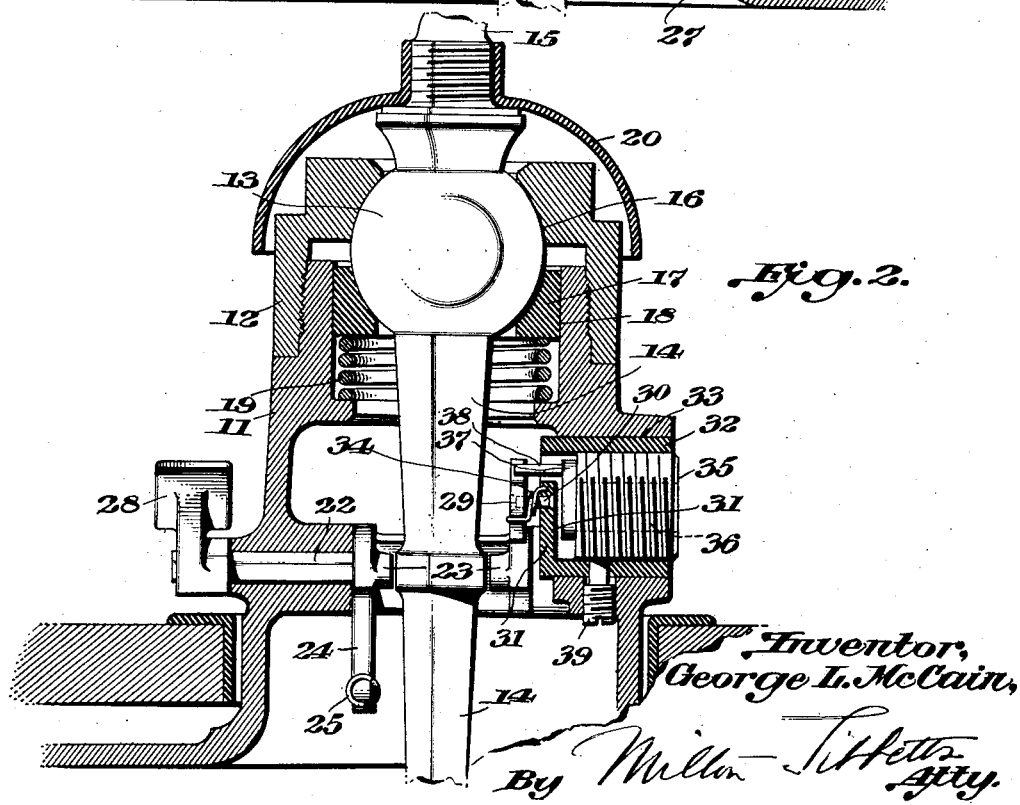

Further objects of the invention will appear from the following specification taken in connection with the drawings which form a part thereof and in which:

Fig. 1 is a longitudinal sectional view through the lever mounting and illustrating the lever and lock partly in side elevation; and Fig. 2 is a transverse sectional view of the construction shown in Fig. 1.

The lever control mechanism is mounted in a casing 10 which is supported in any suitable manner on the transmission case or housing of the motor vehicle and comprises a lower section 11 which is secured to the transmission case, and an upper section 12 made in the form of a cover or cap, this cover having screw threaded engagement with the section 11. The lever is formed with a spherical bearing portion 13, a downwardly extending arm 14 which engages and operates the gear shifting mechanism, and an upwardly extending handle 15. The spherical portion 13 is seated in a spherical bearing 16 formed on the cover 12, and a complementary spherical bearing member 17 slidably mounted in the recess 18 formed in the casing 10, and spring pressed into engagement with the spherical bearing portion 13 by means of a compression spring 19. A shield 20 is secured to the lever intermediate the handle 15 and the spherical bearing, this shield preventing the operator from contact with the cover 12 of the casing.

As above stated, the locking mechanism to be described is adapted to retain the control lever in neutral position by preventing the lateral shifting of the lever on its fulcrum for selective engagement with the shiftable elements. This locking mechanism comprises a locking member 21 having laterally extending trunnions 22 journaled in the casing 10, the member being formed in the shape of a bell crank lever, as illustrated in Fig. 1, and comprising a bifurcated portion 23, the bifurcations of this portion being positioned on the opposite sides of the lever when the locking member is in locking position. This member also has a downwardly extending arm 24 and a spring 25 is secured at one end, as shown at 26, to this arm, and at its opposite end to an eye 27, formed on and secured to casing 10.

As illustrated in Fig. 1, the spring 25 tends to rotate the locking member on its pivot 22 in a direction to unlock the lever.

In order to move the locking member into locking engagement, a treadle 28 is secured to one end of one of the trunnions 22 and by pressing downwardly upon this treadle the locking member can be moved to locking position.

Means is provided for locking this member 21 in operative position, this means comprising a latch 29 pivoted as shown at 30 to a laterally extending portion 31 of a sleeve 32, the latter being secured in a laterally extending opening 33 formed in the casing 10. A spring 34 encircles the pivot 30 of the latch 29 and engages at one end the portion 31 of the sleeve 32 and at its opposite end the latch 29, the spring being so mounted that it tends to rotate the latch 29 in a clockwise direction (see Fig. 1) thereby moving the latch into engagement with the locking member 21.

A suitable lock is provided for locking the latch 29 in operative locking position and for releasing the latch from engagement with the locking member 21 and in the embodiment of the invention illustrated this lock is mounted in a screw threaded plug 35 positioned in the sleeve 32 and includes a barrel 36 rotatably mounted in the plug 35 and having secured to its inner end a disc 37, the disc in turn carrying a laterally projecting pin 38 which is positioned in the path of movement of the latch 29 and is adapted to engage and move this latch. It is to be understood, of course, that the usual locking pins or tumblers are used in connection with the barrel 36, these locking pins being released in the well known manner by the insertion of a key. A set screw 39 is threaded into the casing 10 and passes through the sleeve 32 into engagement with the plug 35 to prevent the rotation of this plug.

Assuming that the treadle 28 has been actuated to move locking member 21 into locking position as shown in Fig. 1, it will be seen that the locking member will be retained in this position by the spring latch 29. When the operator desires to unlock the control lever, it is necessary merely to insert the proper key in the barrel 36 of the lock and to rotate the barrel and pin 38, thereby rotating the latch in an anti-clockwise direction, releasing the locking member 21. After this member has been so released the spring 25 will move the locking member upon its pivot out of engagement with the control lever, whereupon this lever may be moved from its neutral position laterally into selective engagement with the shiftable elements.

Although one specific embodiment of the invention has been illustrated and described, it will be understood that changes in the construction and in the arrangement of the various elements may be made without departing from the spirit or scope of the invention as expressed in the following claims.

Having described my invention, what I claim and desire to secure by Letters Patent is:

1. Locking mechanism comprising in combination, a casing, a lever pivoted therein, a locking member mounted in said casing and engageable with said lever, means for moving said member into locking engagement with said lever, means for retracting said member from its locking position, and a latch engaging the free end of said member for retaining said member in locking position.

2. Locking mechanism comprising in combination, a casing, a lever pivoted therein, a locking member pivoted in said casing, means for moving said member into locking position, resilient means for retracting said member from this locking position, and a pivoted latch engaging said member adjacent its free end for retaining said member in locking position.

3. Locking mechanism comprising, in combination, a casing, a lever pivoted therein, a locking member having bifurcations adapted to be positioned at the sides of said lever to prevent lateral movement thereof, means for moving said member to locking position, means for retracting said member, and means operating on one of said bifurcations for retaining said member in locking position.

In testimony whereof I affix my signature.

GEORGE L. McCAIN.